(12) United States Patent
Geller

(10) Patent No.: US 6,910,680 B1
(45) Date of Patent: Jun. 28, 2005

(54) VEHICLE JACKING SYSTEM

(76) Inventor: Robert E. Geller, 168 E. Columbine La., Westfield, IN (US) 46074

(*) Notice: Subject to any disclaimer, the term of this patent is extended or adjusted under 35 U.S.C. 154(b) by 97 days.

(21) Appl. No.: 10/407,034

(22) Filed: Apr. 4, 2003

(51) Int. Cl.⁷ .................................................. B60S 9/02
(52) U.S. Cl. ....................... 254/423; 254/418
(58) Field of Search ................ 254/423–425, 254/89 H, 93 VA, 93 R, 418

(56) References Cited

U.S. PATENT DOCUMENTS

| | | |
|---|---|---|
| 3,860,216 A | 1/1975 | Brown |
| 5,188,379 A | 2/1993 | Krause et al. |
| D348,966 S | 7/1994 | Guyton |
| 5,713,560 A * | 2/1998 | Guarino ...................... 254/423 |
| 5,722,641 A * | 3/1998 | Martin et al. ............... 254/423 |
| 5,765,810 A * | 6/1998 | Mattera ...................... 254/423 |
| 5,931,500 A * | 8/1999 | Dagnese .................. 280/766.1 |
| 6,050,573 A | 4/2000 | Kunz |
| 6,527,254 B1 * | 3/2003 | Prevete ...................... 254/423 |
| 2002/0100901 A1 * | 8/2002 | Topelberg et al. .......... 254/423 |

* cited by examiner

Primary Examiner—Lee D. Wilson

(57) ABSTRACT

A vehicle jacking system for jacking up a quadrant of a vehicle to facilitate a maintenance action. The vehicle jacking system includes an automobile having a chassis and a body; at least one jacking assembly operationally coupled to the chassis, for facilitating elevation a quadrant of the automobile.

5 Claims, 2 Drawing Sheets

VEHICLE JACKING SYSTEM

BACKGROUND OF THE INVENTION

1. Field of the Invention

The present invention relates to vehicular leveling systems and more particularly pertains to a new vehicle jacking system for jacking up a quadrant of a vehicle to facilitate a maintenance action.

2. Description of the Prior Art

The use of vehicular leveling systems is known in the prior art. U.S. Pat. No. 3,860,216 describes a system using a ram and a pivotal lift system. Another type of vehicular leveling systems is U.S. Pat. No. 5,188,379 having four jack assemblies for leveling a vehicle.

While these devices fulfill their respective, particular objectives and requirements, the need remains for a system that has certain improved features such as manual actuation and quadrant selectable lift.

SUMMARY OF THE INVENTION

The present invention meets the needs presented above by providing fixed jacks permanently affixed to the chassis of an automobile.

Still yet another object of the present invention is to provide a new vehicle jacking system that allows a car to be jacked up to facilitate replacing a tire.

Even still another object of the present invention is to provide a new vehicle jacking system that increases user safety by eliminating separate jacks which can slip out of position.

To this end, the present invention generally comprises an automobile having a chassis and a body; and at least one jacking assembly operationally coupled to the chassis for facilitating elevation a quadrant of the automobile.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
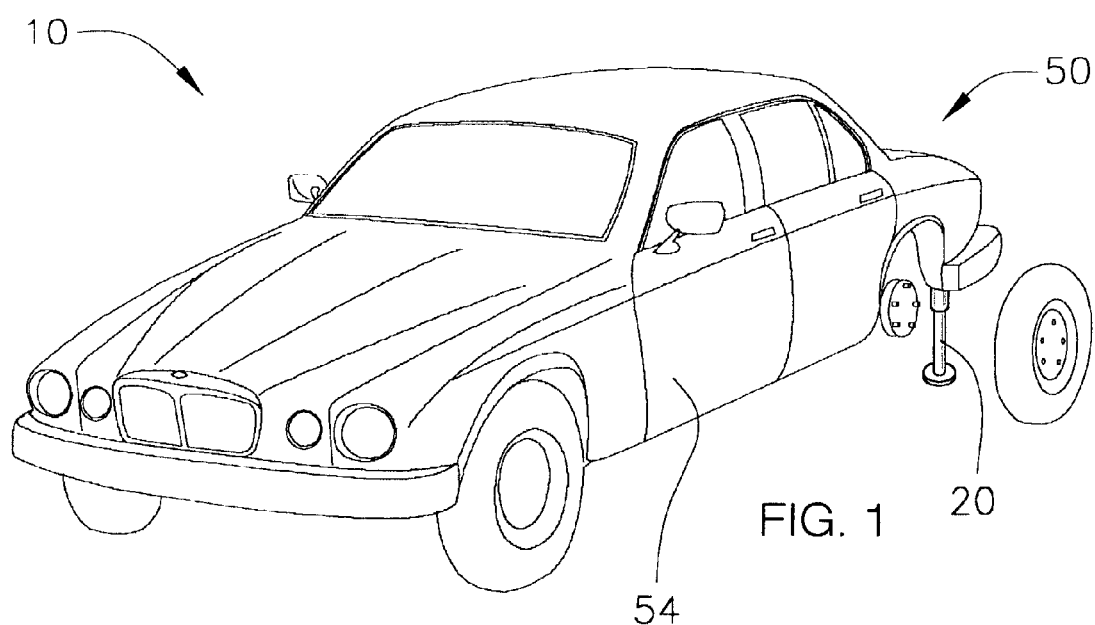
FIG. 1 is a schematic perspective view of a new vehicle jacking system in use according to the present invention.
Figure 2:
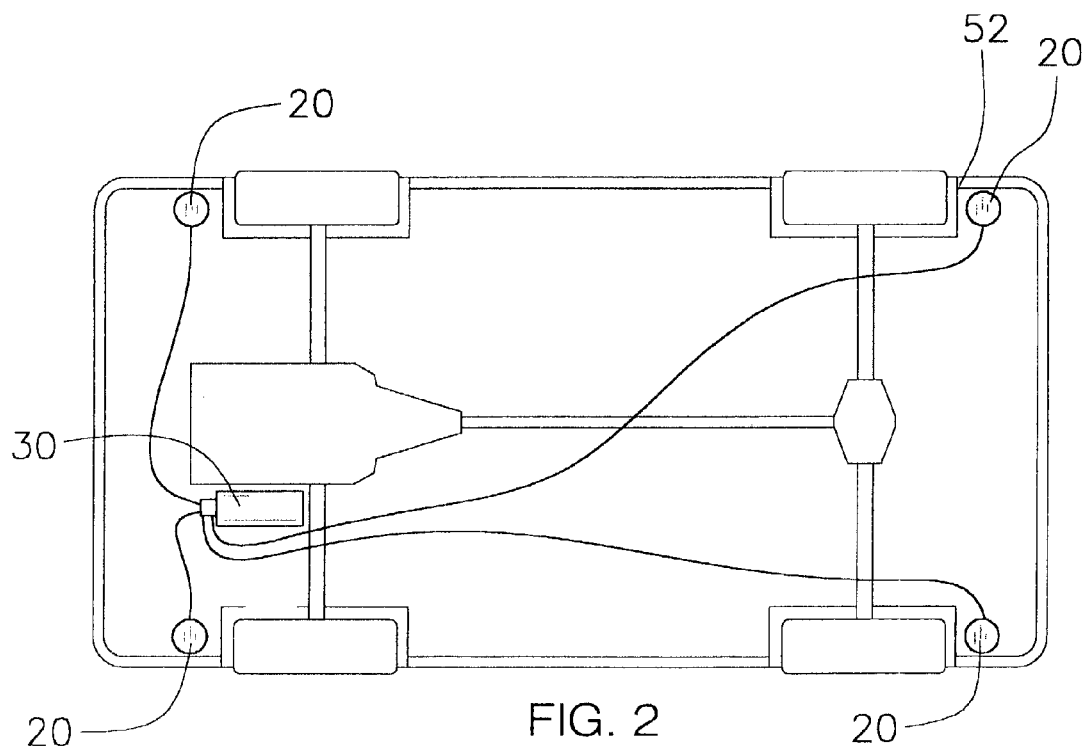
FIG. 2 is a schematic bottom view of the present invention.
Figure 3:
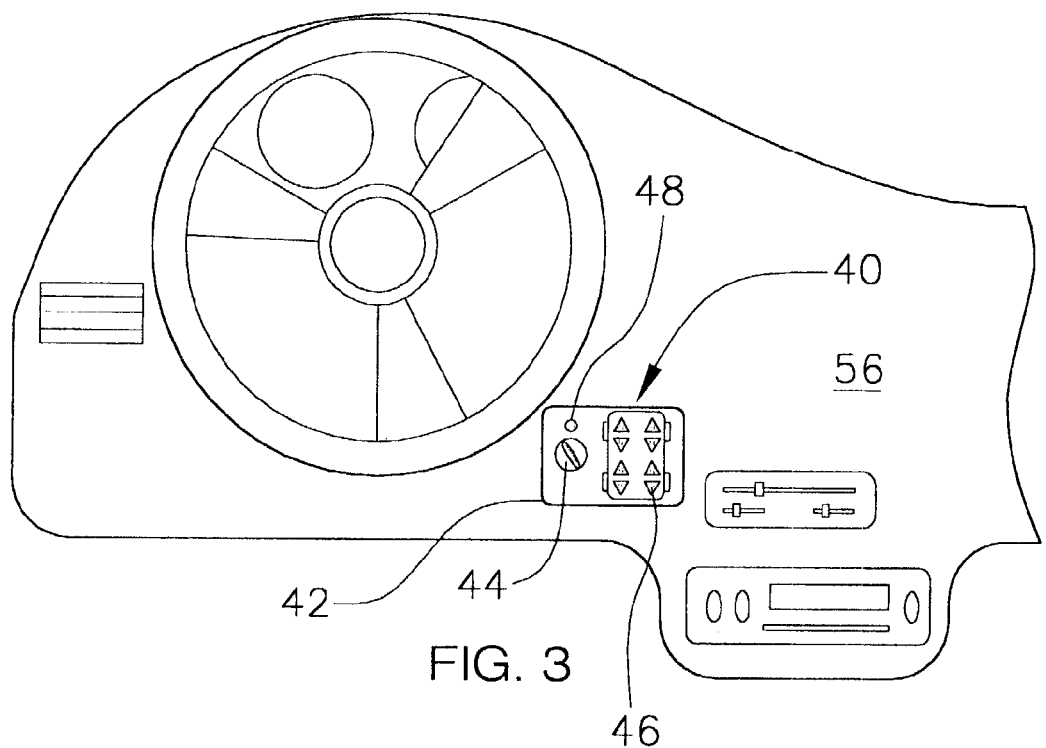
FIG. 3 is a schematic front view of the control assembly present invention.
Figure 4:
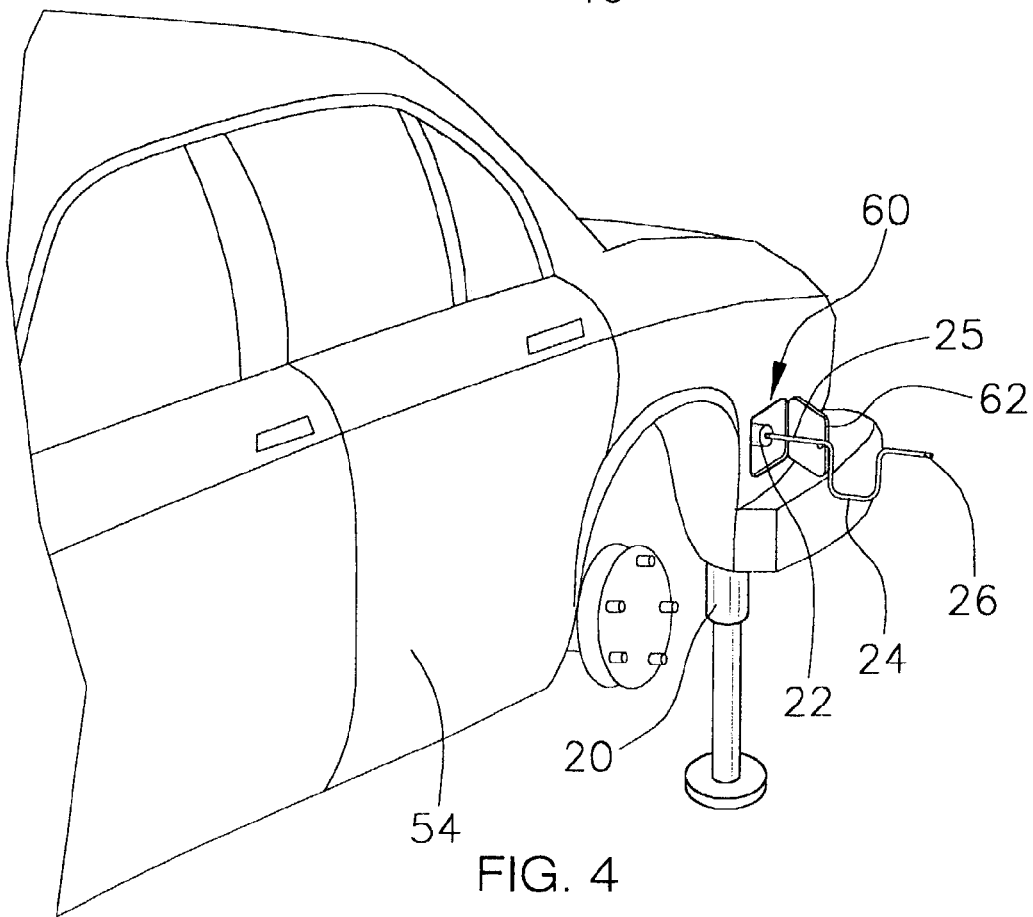
FIG. 4 is a schematic perspective view of an embodiment of the present invention.

With reference now to the drawings, and in particular to FIGS. 1 through 4 thereof, a new vehicle jacking system embodying the principles and concepts of the present invention and generally designated by the reference numeral 10 will be described.

As best illustrated in FIGS. 1 through 4, the vehicle jacking system 10 generally comprises a quartet of jacking assemblies 20, a hydraulic pump 30 and a control assembly 40. The system 10 may be retrofit onto an automobile 50 or be part of the automobiles 50 original equipment. Each one of the jacking assemblies 20 is coupled to the chassis 52 adjacent to an associated corner of the chassis 52. Each one of the jacking assemblies 20 is hydraulically actuated. The hydraulic pump 30 is operationally coupled to the chassis 52. The hydraulic pump 30 is fluidly coupled to each one of the quartet of jacking assemblies 20 for facilitating actuation of each one of the quartet of jacking assemblies 20. The control assembly 40 is operationally coupled to the hydraulic pump 30. The control assembly 40 is used for selecting which one of the quartet of jacking assemblies 20 is to be actuated by the hydraulic pump 30.

In an embodiment the control assembly 40 includes a housing 42 couplable to a dashboard 56 of the automobile 50. The control assembly 40 includes a power switch 44 for controlling the hydraulic pump 30. The control assembly 40 includes a plurality of actuators 46 for selecting which one of the quartet of jacking assemblies 20 is actuated by the hydraulic pump 30. The control assembly 40 includes a power on indicator 48 for providing a visual indication to a user that power is applied to the hydraulic pump 30.

In another embodiment the automobile body 50 includes an opening 60 and a cover member 62 hingedly coupled to the body 54. The cover member 62 is for selectively covering the opening 60. At least one jacking assembly 20 is operationally coupled to the chassis 52 adjacent to the opening 60. The jacking assembly 20 facilitates elevation a quadrant of the automobile 50. The jacking assembly 20 includes a manual actuation means 22. A hand crank 24 includes a first end 25 and a second end 26. The first end 25 is selectively couplable to the manual actuation means 22. The second end 26 is designed for is grasped by a human hand. The hand crank 24 is rotatable. Rotating the hand crank 24 actuates the jacking assembly 20 and a quadrant of the automobile 50 is elevated.

In use, the user determines which quadrant of the automobile need to be elevated and selects the proper control actuator of the control assembly. The control assembly activates the hydraulic pump and actuates the appropriate jacking assembly. The user then performs any maintenance tasks requires, such as changing a tire. The user then activates the hydraulic pump again via the control assembly to return the jacking assembly to a stored position.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle jacking system comprising:

an automobile having a chassis and a body;

at least one jacking assembly operationally coupled to said chassis, said jacking assembly facilitating elevation a quadrant of said automobile;

said body having an opening adjacent to said jacking assembly, said opening facilitating access to said jacking assembly;

a cover member hingedly coupled to said body, said cover member being for selectively covering said opening;

said jacking assembly having a manual actuation means;

a hand crank having a first end and a second end, said first end being selectively couplable to said manual actuation means, said second end being adapted for being grasped by a human hand, said hand crank being rotatable whereby rotating said hand crank actuates said jacking assembly as a quadrant of said automobile is elevated.

2. A vehicle jacking system comprising:

an automobile having a chassis and a body;

at least one jacking assembly operationally coupled to said chassis, said jacking assembly facilitating elevation a quadrant of said automobile;

a quartet of jacking assemblies, each one of said jacking assemblies being coupled to said chassis adjacent to an associated corner of said chassis, each one of said jacking assemblies being hydraulically actuated;

a hydraulic pump operationally coupled to said chassis, said hydraulic pump being fluidly coupled to each one of said quartet of jacking assemblies for facilitating actuation of each one of said quartet of jacking assemblies.

3. The system of claim 2, further comprising a control assembly operationally coupled to said hydraulic pump, said control assembly selecting which one of said quartet of jacking assemblies is to be actuated by said hydraulic pump.

4. The system of claim 3, further comprising:

wherein said control assembly includes a housing couplable to a dashboard of said automobile, said control assembly having a power switch of controlling said hydraulic pump, said control assembly having a plurality of actuators for selecting which one of said quartet of jacking assemblies is actuated by said hydraulic pump, said control assembly having a power on indicator for providing a visual indication to a user that power is applied to said hydraulic pump.

5. A vehicle jacking system for use with an automobile having a chassis and a body, the body having an opening and a cover member hingedly coupled to the body, the cover member being for selectively covering the opening comprising:

at least one jacking assembly operationally coupled to the chassis adjacent to the opening, said jacking assembly facilitating elevation a quadrant of the automobile;

said jacking assembly having a manual actuation means;

a hand crank having a first end and a second end, said first end being selectively couplable to said manual actuation means when inserted through the opening in the body of the automobile, said second end being adapted for being grasped by a human hand, said hand crank being rotatable whereby rotating said hand crank actuates said jacking assembly through said manual actuation means as a quadrant of the automobile is elevated.

* * * * *